(12) United States Patent
Hashiwaki et al.

(10) Patent No.: US 10,593,984 B2
(45) Date of Patent: Mar. 17, 2020

(54) NONAQUEOUS ELECTROLYTE SECONDARY BATTERY INSULATING POROUS LAYER

(71) Applicant: Sumitomo Chemical Company, Limited, Tokyo (JP)

(72) Inventors: Hiroki Hashiwaki, Niihama (JP); Junji Suzuki, Niihama (JP); Syuichi Nakamoto, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 93 days.

(21) Appl. No.: 15/593,400

(22) Filed: May 12, 2017

(65) Prior Publication Data

US 2018/0301736 A1 Oct. 18, 2018

(30) Foreign Application Priority Data

Apr. 14, 2017 (JP) .................................. 2017-080832

(51) Int. Cl.
*H01M 10/02* (2006.01)
*H01M 2/16* (2006.01)
*H01M 10/05* (2010.01)

(52) U.S. Cl.
CPC ............ *H01M 10/02* (2013.01); *H01M 2/16* (2013.01); *H01M 2/1673* (2013.01); *H01M 10/05* (2013.01)

(58) Field of Classification Search
CPC .......................... H01M 2/1686; H01M 2/1653
See application file for complete search history.

(56) References Cited

U.S. PATENT DOCUMENTS

| 6,447,958 | B1 | 9/2002 | Shinohara et al. | |
| 2010/0062342 | A1* | 3/2010 | Li ........................ | H01M 2/162 429/254 |
| 2011/0165469 | A1* | 7/2011 | Nishikawa ............ | H01M 2/145 429/248 |
| 2015/0325831 | A1* | 11/2015 | Dennes ................ | H01M 2/1673 429/144 |

FOREIGN PATENT DOCUMENTS

| JP | 200030686 A | | 1/2000 |
| JP | 200123602 A | | 1/2001 |
| WO | WO 2015/140356 | * | 9/2015 |

* cited by examiner

*Primary Examiner* — Olatunji A Godo
(74) *Attorney, Agent, or Firm* — Panitch Schwarze Belisario & Nadel LLP

(57) ABSTRACT

The present invention has an object to provide (i) a nonaqueous electrolyte secondary battery separator having excellent ion permeability and (ii) an insulating porous layer by which to achieve the nonaqueous electrolyte secondary battery separator. The insulating porous layer is a nonaqueous electrolyte secondary battery insulating porous layer containing: a resin A; and a resin B, the resin A and the resin B having therebetween a Hansen solubility parameter distance (HSP distance) (Ra) of not more than 10 $MPa^{1/2}$.

7 Claims, No Drawings

NONAQUEOUS ELECTROLYTE SECONDARY BATTERY INSULATING POROUS LAYER

This Nonprovisional application claims priority under 35 U.S.C. § 119 on Patent Application No. 2017-080832 filed in Japan on Apr. 14, 2017, the entire contents of which are hereby incorporated by reference.

TECHNICAL FIELD

The present invention relates to (i) an insulating porous layer for a nonaqueous electrolyte secondary battery (hereinafter referred to as a "nonaqueous electrolyte secondary battery insulating porous layer"), (ii) a laminated separator for a nonaqueous electrolyte secondary battery (hereinafter referred to as a "nonaqueous electrolyte secondary battery laminated separator"), (iii) a member for a nonaqueous electrolyte secondary battery (hereinafter referred to as a "nonaqueous electrolyte secondary battery member"), and (iv) a nonaqueous electrolyte secondary battery.

BACKGROUND ART

Nonaqueous electrolyte secondary batteries, especially lithium ion secondary batteries, each of which has a high energy density, have been widely used as batteries for use in, for example, a personal computer, a mobile phone, and a portable information terminal. Further, nonaqueous electrolyte secondary batteries have recently been being developed as on-vehicle batteries.

As a nonaqueous electrolyte secondary battery separator, Patent Literature 1 discloses a laminated separator including a porous layer formed by coating a polyolefin porous film with a heat-resistant resin.

Meanwhile, Patent Literature 2 discloses a laminated separator including a porous layer formed by coating a polyolefin porous film with a resin and a filler made of a ceramic powder.

CITATION LIST

Patent Literatures

[Patent Literature 1]
Japanese Patent Application Publication, Tokukai, No. 2001-23602 (Publication Date: Jan. 26, 2001)
[Patent Literature 2]
Japanese Patent Application Publication, Tokukai, No. 2000-30686 (Publication Date: Jan. 28, 2000)

SUMMARY OF INVENTION

Technical Problem

However, a nonaqueous electrolyte secondary battery laminated separator including such a conventional porous layer as described earlier has room for improvement in ion permeability.

The present invention has an object to provide (i) a nonaqueous electrolyte secondary battery laminated separator having excellent ion permeability and (ii) an insulating porous layer by which to achieve the nonaqueous electrolyte secondary battery laminated separator.

Solution to Problem

The present invention includes the following [1] through [10]:

[1] A nonaqueous electrolyte secondary battery insulating porous layer containing: a resin A; and a resin B, the resin A and the resin B being a combination of two kinds of resins that have the greatest total weight of resins contained in the nonaqueous electrolyte secondary battery insulating porous layer, and the resin A and the resin B having therebetween a Hansen solubility parameter distance (HSP distance) (Ra) of not more than 10 MPa$^{1/2}$.

[2] The nonaqueous electrolyte secondary battery insulating porous layer as set forth in [1], wherein the nonaqueous electrolyte secondary battery insulating porous layer has an air permeability of not more than 1000 sec/100 cm$^3$.

[3] The nonaqueous electrolyte secondary battery insulating porous layer as set forth in [1] or [2], wherein the resin A and the resin B are each an aromatic polymer.

[4] A nonaqueous electrolyte secondary battery laminated separator including: a porous base material containing a polyolefin-based resin as a main component; and a nonaqueous electrolyte secondary battery insulating porous layer mentioned in any one of [1] through [3], the nonaqueous electrolyte secondary battery insulating porous layer being disposed on at least one surface of the porous base material.

[5] A nonaqueous electrolyte secondary battery member including: a cathode; a nonaqueous electrolyte secondary battery insulating porous layer mentioned in any one of [1] through [3], or a nonaqueous electrolyte secondary battery laminated separator mentioned in [4]; and an anode, the cathode, the nonaqueous electrolyte secondary battery insulating porous layer or the nonaqueous electrolyte secondary battery laminated separator, and the anode being arranged in this order.

[6] A nonaqueous electrolyte secondary battery including: a nonaqueous electrolyte secondary battery insulating porous layer mentioned in any one of [1] through [3], or a nonaqueous electrolyte secondary battery laminated separator mentioned in [4].

[7] The nonaqueous electrolyte secondary battery insulating porous layer as set forth in any one of [1] through [3], wherein at least one of the resin A and the resin B is a heat-resistant resin.

[8] The nonaqueous electrolyte secondary battery insulating porous layer as set forth in any one of [1] through [3], further containing a filler.

Advantageous Effects of Invention

A separator including a nonaqueous electrolyte secondary battery insulating porous layer in accordance with an embodiment of the present invention yields an effect of having excellent ion permeability.

DESCRIPTION OF EMBODIMENTS

The following description specifically discusses embodiments of the present invention. Note that the numerical range "A to B" herein refers to "not less than A and not more than B".

Embodiment 1: Nonaqueous Electrolyte Secondary Battery Insulating Porous Layer A nonaqueous electrolyte secondary battery insulating porous layer in accordance with Embodiment 1 of the present invention (hereinafter, may be herein simply referred to as a "porous layer") is a porous layer containing: a resin A; and a resin B, the resin A and the resin B having therebetween a Hansen solubility parameter distance (HSP distance) (Ra) of not more than 10 MPa$^{1/2}$. Note here that the resin A and the resin B are a combination of two kinds of resins that have the greatest total weight of resins contained in the porous layer. The expression "of resins contained in the porous layer" means "of resins contained in the porous layer (except a filler)". The resin A and the resin B only need to be a combination of two kinds of resins that have the greatest total weight, and it does not matter which one of weight fractions of the two kinds of resins is greater than the other of the weight fractions. Further, in a case where there are two or more sorts of combinations of two kinds of resins that have the greatest total weight, "two kinds of resins that have the greatest total weight" only need to be any one of the two or more sorts of combinations. The porous layer can be provided on a porous base material of a separator of a nonaqueous electrolyte secondary battery and serve as a member constituting a nonaqueous electrolyte secondary battery laminated separator. The porous layer can also be provided directly on an electrode.

In a case where the porous layer in accordance with an embodiment of the present invention is a nonaqueous electrolyte secondary battery insulating porous layer containing: a resin A; and a resin B, the resin A and the resin B having therebetween a Hansen solubility parameter distance (HSP distance) (Ra) of not more than 10 MPa$^{1/2}$, a separator including such a porous layer has excellent ion permeability.

A Hansen solubility parameter (δ) is defined by three-dimensional parameters (δD, δP, δH) and expressed by the following equation (1). Note that the Hansen solubility parameter is specifically described in "PROPERTIES OF POLYMERS" (author: D. W. VAN KREVELEN, publisher: ELSEVIER SCIENTIFIC PUBLISHING COMPANY, published in 1989, 5th edition).

$$\delta^2 = (\delta D)^2 + (\delta P)^2 + (\delta H)^2 \quad (1)$$

where δD is a London dispersion force term, δP is a molecular polarization term (dipole-dipole force term), and δH is a hydrogen bond term.

δD, δP, and δH can be calculated with the use of HSPiP (Hansen Solubility Parameters in Practice), which is a program developed by a group of Dr. Hansen, who proposed the Hansen solubility parameter. In the present application, Ver. 4.1.07 was used.

Note here that in a case where a resin is a copolymer made up of two or more kinds of monomers, it is not necessarily possible to set a specific structural repeating unit. This makes it impossible to directly calculate the Hansen solubility parameter by the program described earlier. Thus, in such a case, respective Hansen solubility parameters of homopolymers made up of each of the monomers are calculated, and a value obtained by averaging the obtained Hansen solubility parameters of the homopolymers in a molar ratio between the monomers contained in the copolymer is set as a Hansen solubility parameter of the copolymer. Note that "a value obtained by averaging in a molar ratio" herein refers to a value obtained by totalizing, for each of δD, δP, and δH, values obtained by multiplying each of δD, δP, and δH, which are the respective Hansen solubility parameters of the homopolymers made up of each of the monomers, by a molar fraction of the respective monomers. Note also that a "molar fraction" of a certain monomer herein means (a molar amount of the certain monomer)/(a total molar amount of the monomers contained in the copolymer).

In synthesis of polyester, polyamide, polyurethane, or the like, in a case where monomers each of which singly forms no homopolymer, such as a diol monomer, a diamine monomer, a dicarboxylic acid monomer, and diisocyanate are used, HSP calculation can be carried out assuming that those two monomers which can alternately polymerize with each other have completely polymerized with each other.

Note that in a case where there can be a plurality of combinations of monomers which can alternately polymerize with each other, the HSP calculation is carried out as below.

For example, in a case where dicarboxylic acid monomers A1, A2, . . . , An (whose molar amounts are A1m, A2m, . . . , Anm, respectively), diol monomers B1, B2, . . . , Bn (whose molar amounts are B1m, B2m, . . . , Bnm, respectively), and homopolymerizable monomers C1, C2, . . . Cn (whose molar amounts are C1m, C2m, . . . , Cnm, respectively) are present in a system, the HSP calculation is carried out with respect to alternating copolymers made up of all combinations of the dicarboxylic acid monomers and the diol monomers. Then, an abundance ratio of the alternating copolymer made of the dicarboxylic acid monomer Ai and the diol monomer Bi is calculated based on the following expression:

$$\{Aim/(A1m+A2m+\ldots+Anm)\} \times \{Bim/(B1m+B2m+\ldots+Bnm)\} \times \{(A1m+A2m+\ldots+Anm)+(B1m+B2m+\ldots+Bnm)\}/\{(A1m+A2m+\ldots+Anm)+(B1m+B2m+\ldots+Bnm)+(C1m,C2m,\ldots,Cnm)\}$$

where i in each of Ai and Bi represents an integer of not less than 1 and not more than n.

Note that in order to calculate, in accordance with a monomer structure, a Hansen solubility parameter of an alternating polymer obtained from the monomers, it is unnecessary to consider that an unideal structure is produced by a side reaction. For example, a diisocyanate monomer that is used to produce polyurethane can singly form a homopolymer in a case where amine is generated by hydrolysis of an isocyanate group and the amine thus generated and an isocyanate group further react with each other. Note, however, that in the above HSP calculation, such a side reaction is not considered, and a diisocyanate monomer is treated as a monomer that does not singly form a homopolymer.

Note that the HSP distance (Ra) refers to a Hansen solubility parameter (HSP) distance between two substances. The HSP distance (Ra) is an indicator of an affinity between the two substances, and the HSP distance (Ra) which has a smaller value can be said to mean that the two substances have a greater affinity therebetween.

Assuming that $\delta_A$ and $\delta_B$, which are respective Hansen solubility parameters of two substances A and B, are expressed as follows:

$$\delta_A = (\delta D_A, \delta P_A, \delta H_A); \text{ and}$$

$$\delta_B = (\delta D_B, \delta P_B, \delta H_B),$$

the HSP distance (Ra) can be calculated based on the following expression (2):

$$Ra = [4 \times (\delta D_A - \delta D_B)^2 + (\delta P_A - \delta P_B)^2 + (\delta H_A - \delta H_B)^2]^{1/2} \quad (2)$$

According to the porous layer in accordance with an embodiment of the present invention, the resin A and the resin B only need to have therebetween an HSP distance (Ra) of not more than 10 MPa$^{1/2}$. With the arrangement, in a case where the porous layer is provided on the porous base material of the nonaqueous electrolyte secondary battery or on the electrode, an effect of improving ion permeability of an obtained laminated body is achieved.

This seems to be because of the reason below. Specifically, a process in which a layer is made porous during a step of forming a porous layer is generally understood as a viscoelastic phase separation phenomenon. The viscoelastic phase separation phenomenon is a phenomenon in which a solution containing a resin and a solvent is phase-separated into a solid phase and a liquid phase. According to a theory of the viscoelastic phase separation phenomenon, it is considered that a transitional gel state controls a network structure of a final resin in a process in which the resin contained in the solution is phase-separated through the transitional gel state into the solid phase.

In a case where a porous layer is formed by using a mixture of a first resin and a second resin which have therebetween a large HSP distance (Ra), the first resin and the second resin are separated in the process in which the resin contained in the solution is phase-separated through the transitional gel state into the solid phase. Thus, the first resin and the second resin cannot pass through a uniform gel state. Meanwhile, also in a case where only one kind of resin is contained in a solution, the resin cannot pass through a favorable gel state. Thus, it is considered that no porous layer that has a preferable porous structure is formed in a case where a layer of such a solution is provided on the porous base material of the nonaqueous electrolyte secondary battery separator or on the electrode. Therefore, it is estimated that the effect of improving ion permeability cannot be achieved.

In contrast, in a case where a porous layer is formed by using a mixture of a first resin and a second resin which have therebetween a small HSP distance (Ra), the first resin and the second resin are miscible with each other in the process in which the resin contained in the solution is phase-separated through the transitional gel state into the solid phase. Thus, the first resin and the second resin can pass through a gel state in which a moderate resin network structure is formed. Therefore, it is considered that a porous layer that has a preferable structure is formed and the effect of improving ion permeability is achieved.

That is, it is considered that the resin A and the resin B which have therebetween an HSP distance (Ra) of not more than 10 $MPa^{1/2}$ (described earlier) promote uniform gelation in the process in which the resin contained in the solution is phase-separated through the transitional gel state into the solid phase. Thus, a porous layer that has a preferable structure is formed and the effect of improving ion permeability is achieved. It is theoretically possible even for resins that differ in chemical structure to have respective Hansen solubility parameters whose values are close to each other. Note, however, that from the viewpoint of making it easier to form a porous structure having excellent ion permeability, the resin A and the resin B preferably have therebetween an HSP distance (Ra) of not less than 1 $MPa^{1/2}$ or can have therebetween an HSP distance (Ra) of not less than 2 $MPa^{1/2}$.

The resin A and the resin B have a total weight ordinarily of not less than 50% by weight, preferably of not less than 80% by weight, more preferably of not less than 90% by weight, and still more preferably of not less than 95% by weight, with respect to a total weight of the resins contained in the porous layer (except the filler, same applies to the following descriptions).

The resin A and the resin B have a total weight ordinarily of not less than 5% by weight, and preferably of not less than 10% by weight, with respect to a total weight of the porous layer.

The resin A and the resin B are contained in the porous layer in a weight ratio preferably of 10:90 to 90:10, and more preferably of 20:80 to 80:20. The resin A and the resin B which are contained in the porous layer in a weight ratio falling within the above range allow an embodiment of the present invention to achieve an effect of having more excellent ion permeability than a conventional technique.

The porous layer can contain not only the resin A and the resin B but also other resin(s). In such a case, in a case where the resin A and the resin B have a total weight of less than 80% by weight with respect to a total weight of the resins contained in the porous layer, it is more preferable (i) that a third resin that is contained in the porous layer and has the largest weight fraction after the resin A and the resin B be selected and (ii) that not only the resin A and the resin B but also the resin A and the third resin, and the resin B and the third resin have therebetween an HSP distance (Ra) of not more than 10 $MPa^{1/2}$. Meanwhile, in a case where the resin A, the resin B, and the third resin have a total weight of less than 80% by weight, it is more preferable (i) that a fourth resin that has the largest weight fraction after the third resin be selected and (ii) that all sorts of combinations of two kinds of resins selected from the resin A, the resin B, the third resin, and the fourth resin have therebetween an HSP distance (Ra) of not more than 10 $MPa^{1/2}$. It is more preferable (i) that not only the resin A and the resin B but also the third resin, the fourth resin, a fifth resin, a sixth resin, . . . , and/or an nth resin whose weight fraction(s) is/are the largest after the resin A and the resin B be thus selected until these resins have a total weight of not less than 80% by weight with respect to a total weight of the resins contained in the porous layer and (ii) that the respective selected resins also have therebetween an HSP distance (Ra) of not more than 10 $MPa^{1/2}$. With the arrangement, also in a case where three or more kinds of resins are used at relatively large weight fractions, it is possible to achieve the effect of improving ion permeability.

<Resin A, Resin B>

The resin A and the resin B which are contained in the porous layer in accordance with an embodiment of the present invention are resins having respective different structural units, and the resin A and the resin B only need to have therebetween an HSP distance (Ra) of not more than 10 $MPa^{1/2}$. Further, it is more preferable that each of the resin A and the resin B be insoluble in an electrolyte of a battery and electrochemically stable while the battery is being used.

Further, in order to prevent thermal runaway of a nonaqueous electrolyte secondary battery, at least one of the resin A and the resin B is more preferably a heat-resistant resin.

For example, an arrangement in which at least one of the resin A and the resin B is a heat-resistant resin can be exemplified by a case where the resin A is at least a heat-resistant resin, the resin B has, in an amount of not less than 50 mol %, the structural unit different from the structural unit of the resin A, and the resin A and the resin B have therebetween an HSP distance (Ra) of not more than 10 $MPa^{1/2}$.

It is not essential that each of the resin A and the resin B be a heat-resistant resin. Note, however, that the resin A and the resin B each of which has a higher heat resistance allow the nonaqueous electrolyte secondary battery in which the porous layer is used to be safer against heat. Thus, each of the resin A and the resin B is more preferably a resin having a high melting point. It is possible to more preferably use an aromatic compound as each of the resin A and the resin B because the aromatic compound is generally heat-resistant.

Note here that the "heat-resistant resin" herein refers to a resin having a melting point equal to or higher than a melting point of a polyolefin-based resin which is a main component of the porous base material, and the heat-resistant resin is preferably a resin having a melting point of not less than 150° C. Further, the heat-resistant resin which has a higher melting point is preferable because such a heat-resistant resin allows a battery to be safer against heat.

Examples of the resins contained in the porous layer in accordance with an embodiment of the present invention (including the resin A and the resin B) encompass polyolefin, poly(meth)acrylate, polyamide, polyimide, polyester, polycarbonate, polysulfone, polyacetal, and the like.

Of the above resins, a resin having a melting point of not less than 150° C. can exemplify the heat-resistant resin.

The heat-resistant resin is preferably an aromatic polymer because the aromatic polymer generally has a high melting point. Examples of such an aromatic polymer encompass aromatic polyamide, aromatic polyimide, aromatic polyester, aromatic polycarbonate, and aromatic polysulfone. Further, the aromatic polymer is more preferably a wholly aromatic polymer whose main chain has no aliphatic carbon.

Note that common names of polymers described herein each indicate a main binding type of the polymer. For example, in a case where an aromatic polymer in accordance with an embodiment of the present invention is an aromatic polymer referred to as "aromatic polyester", "aromatic polyester" indicates that not less than 50% of bonds constituting a main chain in molecules of the aromatic polymer are ester bonds. Therefore, the aromatic polymer referred to as "aromatic polyester" can contain, in bonds constituting a main chain, bonds other than ester bonds (such as amide bonds and imide bonds).

In particular, the aromatic polymer is more preferably a nitrogen-containing aromatic polymer from the viewpoint of heat resistance. Examples of the nitrogen-containing aromatic polymer encompass aromatic polyamides such as wholly aromatic polyamide (aramid resin) and semiaromatic polyamide, aromatic polyimide, polybenzimidazole, aromatic polyurethane, melamine resin, and the like.

The porous layer can contain one kind or two or more kinds of the heat-resistant resins mentioned earlier.

Examples of the aromatic polyamide encompass: wholly aromatic polyamides such as para-aramid and meta-aramid; semi-aromatic polyamide; 6T nylon; 6I nylon; 8T nylon; 10T 8T nylon; denatured 10T nylon; denatured 6I nylon; denatured 8T nylon; denatured 10T nylon; copolymers of these; and the like. Of the above aromatic polyamides, from the viewpoint of heat resistance, a wholly aromatic polyamide is preferable, and para-aramid is more preferable.

A method of preparing the aromatic polyamide is exemplified by, but not particularly limited to, condensation polymerization of para-oriented aromatic diamine and para-oriented aromatic dicarboxylic acid halide. In such a case, aromatic polyamide to be obtained substantially includes repeating units in which amide bonds are bonded at para orientation positions or quasi-para orientation positions (for example, orientation positions that extend coaxially or parallel in opposite directions as in 4,4'-biphenylene, 1,5-naphthalene, 2,6-naphthalene, or the like) of aromatic rings. Specific examples of the aromatic polyamide include para-aramids each having a para-oriented structure or a quasi-para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloro-paraphenylene terephthalamide), and a paraphenylene terephthalamide/2,6-dichloroparaphenylene terephthalamide copolymer.

The aromatic polyamide can be poly(paraphenylene terephthalamide) (hereinafter abbreviated as "PPTA"). A solution of the PPTA can be prepared by, for example, the following specific steps (1) through (4).

(1) N-methyl-2-pyrrolidone (hereinafter also abbreviated as "NMP") is introduced into a flask which is dried. Then, calcium chloride, which has been dried at 200° C. for 2 hours, is added. Then, the flask is heated to 100° C. to completely dissolve the calcium chloride.

(2) A temperature of the solution obtained in the step (1) is returned to room temperature, and then paraphenylenediamine (hereinafter abbreviated as "PPD") is added. Then, the PPD is completely dissolved.

(3) While a temperature of the solution obtained in the step (2) is maintained at 20±2° C., terephthalic acid dichloride (hereinafter abbreviated as "TPC") is added in 10 separate portions at approximately 5-minute intervals.

(4) While a temperature of the solution obtained in the step (3) is maintained at 20±2° C., the solution is matured for 1 hour, and is then stirred under reduced pressure for 30 minutes to eliminate air bubbles, so that the solution of the PPTA is obtained.

The aromatic polyimide is preferably wholly aromatic polyimide prepared by condensation polymerization of an aromatic diacid anhydride and an aromatic diamine. Specific examples of the aromatic diacid anhydride include pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl)hexafluoropropane, 3,3',4,4'-biphenyl tetracarboxylic dianhydride, and the like. Specific examples of the aromatic diamine include oxydianiline, paraphenylenediamine, benzophenone diamine, 3,3'-methylenedianiline, 3,3'-diaminobenzophenone, 3,3'-diaminodiphenyl sulfone, 1,5'-naphthalene diamine, and the like. More preferable examples of the aromatic polyimide encompass a polyimide, which is soluble in a solvent, such as a polyimide that is a polycondensate obtained from 3,3',4,4'-diphenyl sulfone tetracarboxylic dianhydride and an aromatic diamine.

Examples of the aromatic polyamide or aromatic polyimide encompass aromatic amide or aromatic polyimide obtained by condensation polymerization of aromatic dicarboxylic acid and aromatic diisocyanate, and aromatic polyamide or aromatic polyimide obtained by condensation polymerization of aromatic diacid anhydride and aromatic diisocyanate. Specific examples of the aromatic dicarboxylic acid encompass isophthalic acid, terephthalic acid, and the like. Specific examples of the aromatic diacid anhydride encompass trimellitic anhydride and the like. Specific examples of the aromatic diisocyanate encompass 4,4'-diphenylmethane diisocyanate, 2,4-tolylene diisocyanate, 2,6-tolylene diisocyanate, ortho tolylane diisocyanate, m-xylene diisocyanate, and the like.

The aromatic polyester is preferably a wholly aromatic polyester from the viewpoint of heat resistance. Examples of the aromatic polyester encompass the following aromatic polyesters.

(1) A polymer obtained by polymerizing an aromatic hydroxycarboxylic acid, an aromatic dicarboxylic acid, and an aromatic diol, (2) A polymer obtained by polymerizing aromatic hydroxycarboxylic acids of identical type or differing types, (3) A polymer obtained by polymerizing an aromatic dicarboxylic acid and an aromatic diol, (4) A polymer obtained by polymerizing (i) an aromatic hydroxycarboxylic acid, (ii) an aromatic dicarboxylic acid, and (iii) an aromatic amine having a phenolic hydroxide group, (5) A polymer obtained by polymerizing (i) an aromatic dicarboxylic acid and (ii) an aromatic amine having a phenolic hydroxide group, (6) A polymer obtained by polymerizing an aromatic hydroxycarboxylic acid, an aromatic dicarboxylic acid, and an aromatic diamine, (7) A polymer obtained by polymerizing an aromatic hydroxycarboxylic acid, an aromatic dicarboxylic acid, an aromatic diamine, and an aromatic diol, (8) A polymer obtained by polymerizing (i) an aromatic hydroxycarboxylic acid, (ii) an aromatic dicarboxylic acid, (iii) an aromatic amine having a phenolic hydroxide group, and (iv) an aromatic diol.

Of the aromatic polyesters above, the aromatic polyesters of (4) through (7) or (8) are preferable in view of solubility in a solvent. Excellent solubility in a solvent allows an increase in productivity of a porous layer.

Note that instead of using an aromatic hydroxycarboxylic acid, aromatic dicarboxylic acid, an aromatic diol, an aromatic diamine, or an aromatic amine having a phenolic hydroxide group, it is possible to use (i) an ester-forming derivative of any of these or (ii) an amide-forming derivative of any of these.

Examples of the ester-forming derivatives of carboxylic acids and amide-forming derivatives of carboxylic acids encompass (i) compounds, such as an acid chloride and an acid anhydride, in each of which a carboxyl group is a highly reactive derivative so that a polyester formation reaction or a polyamide formation reaction is promoted, (ii) compounds in each of which an ester or an amide is formed by a carboxyl group and alcohols, an ethylene glycol, or an amine, any of which generates an polyester or a polyamide by an ester exchange reaction or an amide exchange reaction, respectively, and (iii) the like.

Examples of the ester-forming derivative of the phenolic hydroxide group encompass (i) a compound in which an ester is formed by a phenolic hydroxide group and carboxylic acids so as to generate polyester by an ester exchange reaction, and (ii) the like.

Examples of an amide-forming derivative of an amino group encompass (i) a compound in which an amide is formed by an amino group and carboxylic acids so as to generate polyamide by an amide exchange reaction, and (ii) the like.

Alternatively, the aromatic hydroxycarboxylic acid, the aromatic dicarboxylic acid, the aromatic diol, the aromatic amine having a phenolic hydroxide group, and the aromatic diamine can each be substituted by an alkyl group such as a methyl group or an ethyl group or by an aryl group such as a phenyl group, provided that an ester forming property or an amide forming property is not impaired.

Examples of a repeating structural unit of the aromatic polyester encompass, but are not limited to, the following repeating structural units.

A repeating structural unit derived from an aromatic hydroxycarboxylic acid:

[Chem. 1]

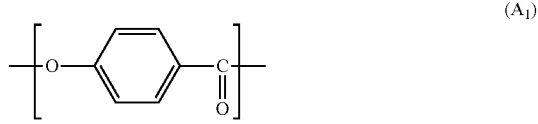
(A$_1$)

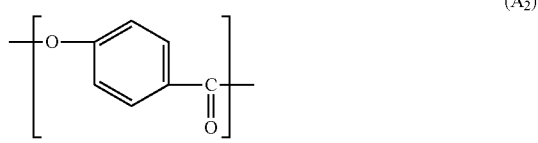
(A$_2$)

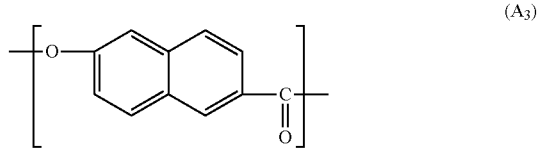
(A$_3$)

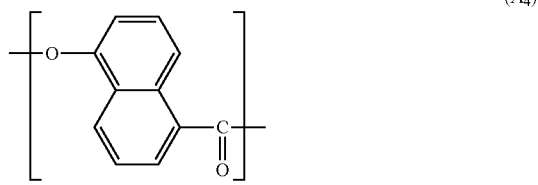
(A$_4$)

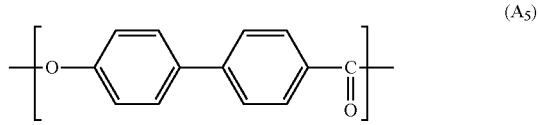
(A$_5$)

The above repeating structural unit can be substituted by an alkyl group or an aryl group.

A repeating structural unit derived from an aromatic dicarboxylic acid:

[Chem. 2]

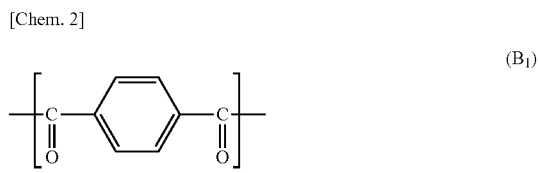
(B$_1$)

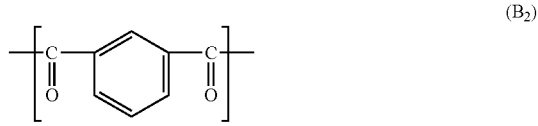
(B$_2$)

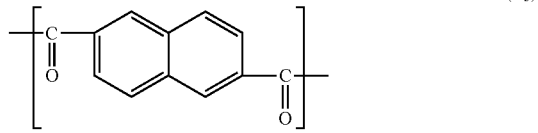
(B$_3$)

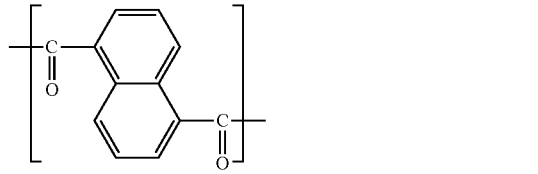
(B$_4$)

-continued

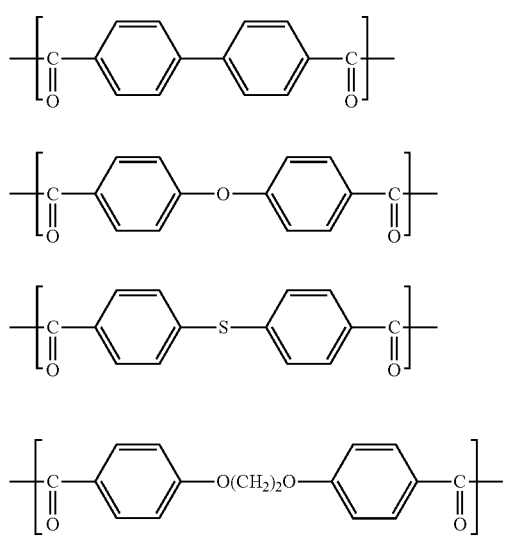

The above repeating structural unit can be substituted by an alkyl group or an aryl group.

A repeating structural unit derived from an aromatic diol:

[Chem. 3]

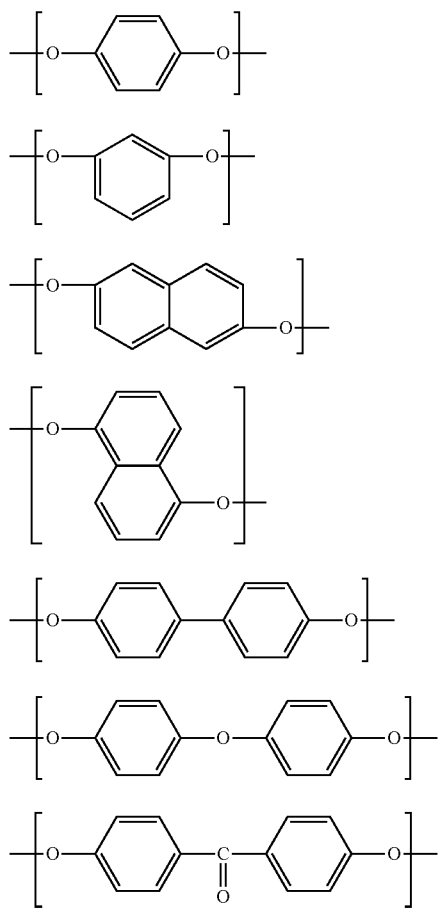

-continued

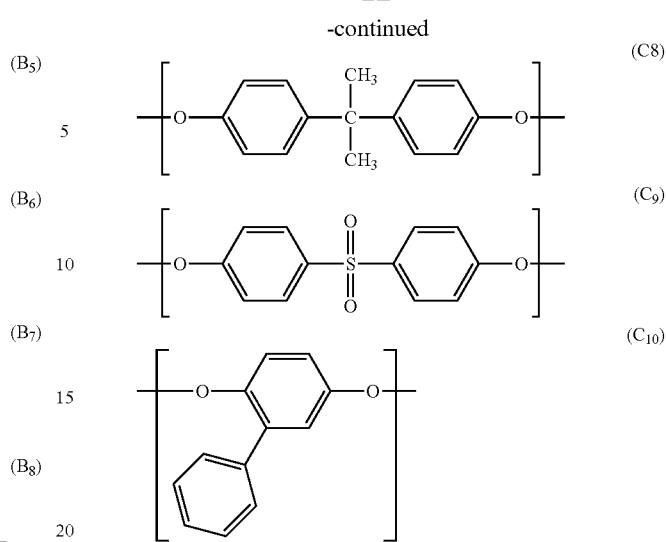

The above repeating structural unit can be substituted by an alkyl group or an aryl group.

A repeating structural unit derived from an aromatic amine having a phenolic hydroxide group:

[Chem. 4]

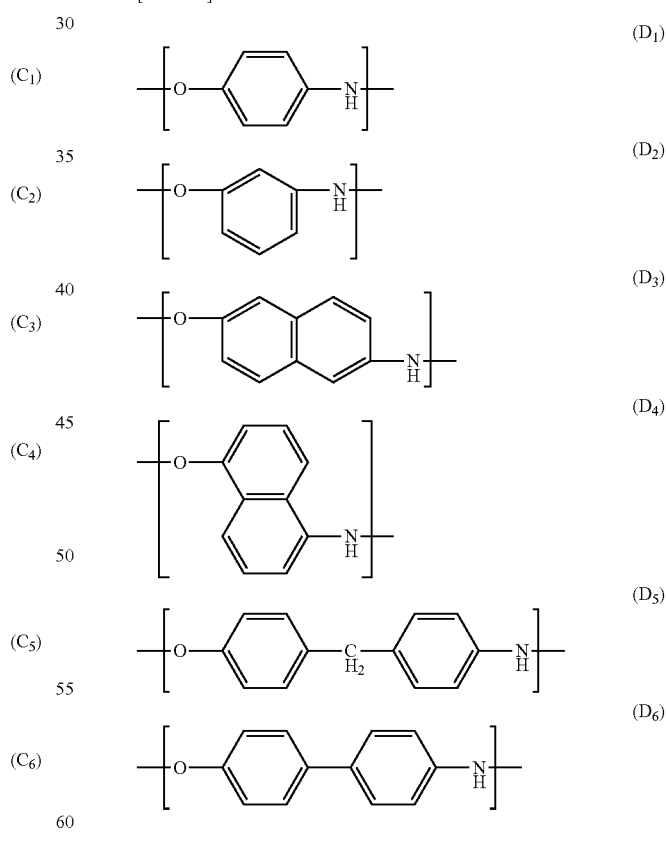

The above repeating structural unit can be substituted by an alkyl group or an aryl group. All or part of hydrogen atoms binding to nitrogen atoms can be substituted by an alkyl group or an acyl group.

A repeating structural unit derived from an aromatic diamine:

[Chem. 5]

(E1) 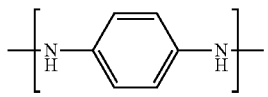

(E2) 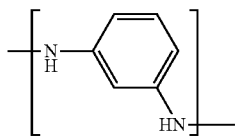

(E3) 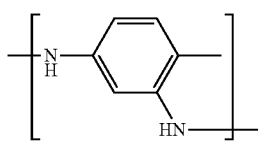

(E4) 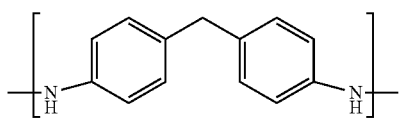

(E5) 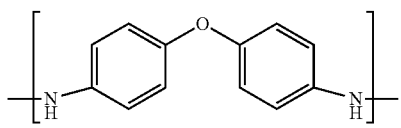

(E6) 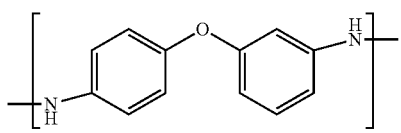

(E7) 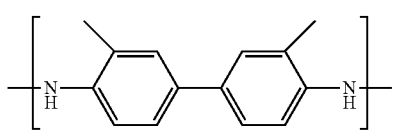

(E8) 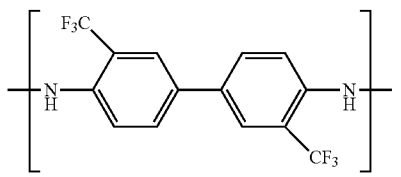

(E9) 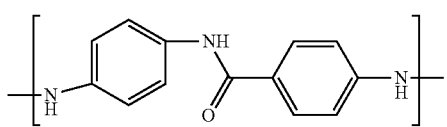

(E10) 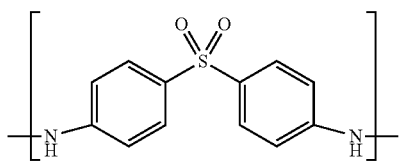

-continued (E11) 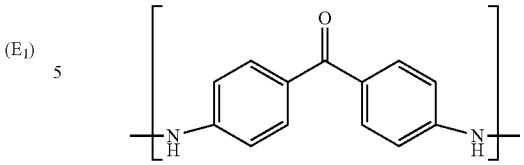

The above repeating structural unit can be substituted by a halogen atom, an alkyl group or an aryl group.

Ordinarily, the alkyl group, by which the repeating structural unit can be substituted, is, for example, a C1-C10 alkyl group which is preferably a methyl group, an ethyl group, a propyl group, or a butyl group. Ordinarily, the aryl group, by which the repeating structural unit can be substituted, is, for example, a C6-C20 aryl group which is preferably a phenyl group. All or part of hydrogen atoms binding to nitrogen atoms can be substituted by an alkyl group or an acyl group. Examples of the halogen atom by which the repeating structural unit can be substituted encompass a fluorine atom, a chlorine atom, and a bromine atom.

In view of a further increase in heat resistance of the nonaqueous electrolyte secondary battery laminated separator in accordance with an embodiment of the present invention, the aromatic polyester preferably contains a repeating unit represented by the above formula ($A_1$), ($A_3$), ($B_1$), ($B_2$) or ($B_3$).

Examples of a preferable combination of the repeating structural units encompass the following combinations (a) through (d):

(a):
a combination of the repeating structural units ($A_1$), ($B_2$), and ($D_1$),
a combination of the repeating structural units ($A_3$), ($B_2$), and ($D_1$),
a combination of the repeating structural units ($A_1$), ($B_1$), ($B_2$), and ($D_1$),
a combination of the repeating structural units ($A_3$), ($B_1$), ($B_2$), and ($D_1$),
a combination of the repeating structural units ($A_3$), ($B_3$), and ($D_1$), or
a combination of the repeating structural units ($B_1$), ($B_2$) or ($B_3$), and ($D_1$).

(b): a combination in which all or part of ($D_1$) in the combination (a) is substituted by ($D_2$).

(c): a combination in which part of ($A_1$) in the combination (a) is substituted by ($A_3$).

(d): a combination in which all or part of ($D_1$) in the combination (a) is substituted by ($C_1$) or ($C_3$).

(e): a combination in which all or part of ($D_1$) in the combination (a) is substituted by ($E_1$) or ($E_5$).

Examples of a more preferable combination encompass (i) a repeating structural unit, in an amount of 10 mol % to 50 mol %, derived from at least one compound selected from the group consisting of p-hydroxybenzoic acid and 2-hydroxy-6-naphthoic acid, (ii) a repeating structural unit, in an amount of 10 mol % to 50 mol %, derived from at least one compound selected from the group consisting of 4-hydroxyaniline and 4,4'-diaminodiphenyl ether, (iii) a repeating structural unit, in an amount of 10 mol % to 50 mol %, derived from at least one compound selected from the group consisting of a terephthalic acid and an isophthalic acid, and (iv) a repeating structural unit, in an amount of 10 mol % to 19 mol %, derived from hydrochinone. Examples of a further preferable combination encompass (i) a repeating structural unit, in an amount of 10 mol % to 35 mol %, derived from 4-hydroxyaniline and (ii) a repeating structural unit, in an amount of 20 mol % to 45 mol %, derived from an isophthalic acid.

A method of preparing the aromatic polymer can be a method known to a person skilled in the art, and is not limited to any particular one. A method of preparing an aromatic polyester will be described below as an example of the method for preparing the aromatic polymer.

Examples of the method of preparing an aromatic polyester encompass a method in which (i) an aromatic hydroxycarboxylic acid, an aromatic diol, an aromatic amine having a phenolic hydroxide group, or an aromatic diamine is subjected to acylation (acylation reaction) by an excess amount of fatty acid anhydride, so that an acylated product is obtained and (ii) the acylated product thus obtained and an aromatic hydroxycarboxylic acid and/or an aromatic dicarboxylic acid are subjected to ester exchange or amide exchange so as to be polymerized.

In the acylation reaction, an amount of the fatty acid anhydride to be added is preferably 1.0 equivalent to 1.2 equivalents with respect to a total amount of the phenolic hydroxide group and the amino group combined.

The acylation reaction is to last preferably 5 minutes to 10 hours at 130° C. to 180° C., and more preferably 10 minutes to 3 hours at 140° C. to 160° C.

Examples of the fatty acid anhydride to be used for the acylation reaction encompass, but are not particularly limited to, acetic anhydride, propionic anhydride, butyric anhydride, isobutyric anhydride, and the like. Two or more of these can be mixed when used. In view of cost and workability, acetic anhydride is preferable.

During the polymerization through the ester exchange or amide exchange, an amount of the acyl group of the acylated product is preferably 0.8 equivalents to 1.2 equivalents with respect to an amount of the carboxyl group. A polymerization temperature is preferably not more than 400° C., and more preferably not more than 350° C.

Note that the acylation reaction and the polymerization through the ester exchange or amide exchange can be carried out in the presence of a catalyst. The catalyst can be a catalyst that is conventionally and publicly known as a polyester polymerization catalyst.

Polymerization through ester exchange or amide exchange is ordinarily melt polymerization. Alternatively, it is possible to carry out melt polymerization and solid phase polymerization in combination. Solid phase polymerization can be carried out by (i) extracting a polymer during a melt polymerization step, (ii) solidifying the extracted polymer, (iii) crushing the resultant polymer into a powder-like polymer or a flake-like polymer, and then (iv) subjecting the powder-like polymer or the flake-like polymer to publicly known solid phase polymerization. Specific examples of the solid phase polymerization encompass (i) a method in which the powder-like polymer or the flake-like polymer in a solid-phase state is heated in an inert atmosphere such as nitrogen at 20° C. to 350° C. for 1 hour to 30 hours, and (ii) the like. Note that an aromatic polyester obtained after the solid phase polymerization can be pelletized by a publicly known method before being used.

Note that in a case where the porous layer of an embodiment of the present invention contains a heat-resistant resin, each of the resin A and the resin B can be the heat-resistant resin, or either one of the resin A and the resin B can be the heat-resistant resin. Alternatively, each of the third resin, the fourth resin, and the like (described earlier) can be the heat-resistant resin, whereas each of the resin A and the resin B can be a non-heat-resistant resin.

<Filler>

The porous layer in accordance with an embodiment of the present invention preferably can further contain a filler. The filler is insulating, and can be made of any material selected from an organic powder, an inorganic powder, and a mixture of an organic powder and an inorganic powder.

Examples of the organic powder encompass powders made of organic matters such as: (i) a homopolymer of a monomer such as styrene, vinyl ketone, acrylonitrile, methyl methacrylate, ethyl methacrylate, glycidyl methacrylate, glycidyl acrylate, or methyl acrylate or (ii) a copolymer of two or more of such monomers; fluorine-based resins such as polytetrafluoroethylene, an ethylene tetrafluoride-propylene hexafluoride copolymer, an ethylene tetrafluoride-ethylene copolymer, and polyvinylidene fluoride; melamine resin; urea resin; polyolefin; polymethacrylate; and the like. The filler can be made of one of these organic powders, or can be made of two or more of these organic powders mixed. Among these organic powders, a polytetrafluoroethylene powder is preferable in view of chemical stability.

Examples of the inorganic powder encompass powders made of inorganic matters such as a metal oxide, a metal nitride, a metal carbide, a metal hydroxide, a carbonate, and a sulfate. Specific examples of the inorganic powder encompass powders made of inorganic matters such as alumina, silica, titanium dioxide, aluminum hydroxide, and calcium carbonate. The filler can be made of one of these inorganic powders, or can be made of two or more of these inorganic powders mixed. Among these inorganic powders, an alumina powder is preferable in view of chemical stability. It is more preferable that particles by which the filler is constituted be all alumina particles. It is a still more preferable embodiment that (i) the particles by which the filler is constituted are all alumina particles and (ii) all or part of the alumina particles are substantially spherical alumina particles. Note that in an embodiment of the present invention, the substantially spherical alumina particles include absolutely spherical particles.

According to an embodiment of the present invention, in a case where, for example, the particles by which the filler is constituted are all alumina particles, a weight of the filler relative to a total weight of the porous layer is ordinarily 20% by weight to 95% by weight, and preferably 30% by weight to 90% by weight, although a filler content of the porous layer depends also on a specific gravity of the material of the filler. The above ranges can be set as appropriate according to the specific gravity of the material of the filler.

Examples of a shape of the filler in accordance with an embodiment of the present invention encompass a substantially spherical shape, a plate-like shape, a pillar shape, a needle shape, a whisker-like shape, a fibrous shape, and the like. Although any particle can be used to constitute the filler, substantially spherical particles are preferable because substantially spherical particles allow uniform pores to be easily made. In view of a strength property and smoothness of the porous layer, an average particle diameter of particles by which the filler is constituted is preferably 0.01 μm to 1 μm. Note that the average particle diameter is to be indicated by a value measured with the use of a photograph taken by a scanning electron microscope. Specifically, any 50 particles of particles captured in the photograph are selected, respective particle diameters of the 50 particles are measured, and then an average value of the particle diameters thus measured is used as the average particle diameter.

<Physical Properties of Porous Layer>

In a case where the porous layer is disposed on both surfaces of a porous base material, the physical properties in the following description regarding physical properties of the porous layer refers to at least physical properties of a porous layer disposed on a surface of the porous base material which surface faces a cathode of the nonaqueous electrolyte secondary battery.

In a case where a porous layer is disposed on one surface or both surfaces of the porous base material, a thickness of the porous layer is preferably 0.5 µm to 45 µm (per surface of the porous film), more preferably 0.5 µm to 20 µm (per surface of the porous film), and still more preferably 0.5 µm to 15 µm (per surface of the porous film), although the thickness of the porous layer can be decided as appropriate in view of a thickness of a nonaqueous electrolyte secondary battery laminated separator to be produced. The thickness of the porous layer is found by subtracting the thickness of the porous base material from an entire portion of the nonaqueous electrolyte secondary battery laminated separator.

The thickness of the porous layer is preferably not less than 0.5 µm (per surface of the porous film). This is because, with such a thickness, (i) an internal short circuit of the battery, which internal short circuit is caused by breakage or the like of the battery, can be sufficiently prevented in a nonaqueous electrolyte secondary battery laminated separator which includes the porous layer and (ii) an amount of an electrolyte retained in the porous layer can be maintained. Meanwhile, a total thickness of both the surfaces of the porous layer is preferably not more than 45 µm. This is because, with such a thickness, (i) it is possible to restrict an increase in resistance to permeation of ions such as lithium ions all over the nonaqueous electrolyte secondary battery laminated separator which includes the porous layers, (ii) it is possible to prevent the cathode from deteriorating in a case where a charge-discharge cycle is repeated, so that a rate characteristic and/or a cycle characteristic is/are prevented from deteriorating, and (iii) an increase in distance between the cathode and an anode is restricted, so that the nonaqueous electrolyte secondary battery can be prevented from being large in size.

<Porous Layer Production Method>

The porous layer can be produced by, for example, (i) dissolving the resin in a solvent and, optionally, dispersing the filler, so as to prepare a coating solution for forming a porous layer and then (ii) coating a base material with the coating solution and then drying the coating solution, so as to deposit a solid content of the coating material as the porous layer. Examples of the base material encompass (i) a porous base material described later, (ii) an electrode, and (iii) the like.

The solvent (dispersion medium) is not limited to any particular one, provided that (i) the solvent does not have an adverse effect on the base material, (ii) the solvent allows the resin to be uniformly and stably dissolved in the solvent, (iii) the solvent allows the filler to be uniformly and stably dispersed in the solvent. Specific examples of the solvent (dispersion medium) encompass N-methylpyrrolidone, N,N-dimethylacetamide, N,N dimethylformamide, and the like. Only one of these solvents (dispersion media) can be used, or two or more of these solvents (dispersion media) can be used in combination.

The coating solution can be formed by any method, provided that the coating solution can satisfy conditions such as a resin solid content (resin concentration) and an amount of the filler, each of which conditions is necessary to obtain a desired porous layer. Specific examples of the method encompass a method in which a filler is, as needed, added to and mixed with a solution which is obtained by dissolving the resin A and the resin B in a solvent (dispersion medium). In a case where the filler is added, the filler can be dispersed in a solvent (dispersion medium) with the use of a conventionally and publicly known dispersing device, examples of which encompass a three-one motor, a homogenizer, a medium type dispersing device, a pressure type dispersing device, and the like.

A method of coating the base material with the coating solution encompass publicly known coating methods such as a knife coater method, a blade coater method, a bar coater method, a gravure coater method, and a die coater method.

A method of removing the solvent (dispersion medium) is generally a drying method. Examples of the drying method encompass natural drying, air-blowing drying, heat drying, drying under reduced pressure, and the like. Note, however, any method can be used, provided that the solvent (dispersion medium) can be sufficiently removed. In addition, drying can be carried out after the solvent (dispersion medium) contained in the coating solution is replaced with another solvent. Specific examples of the method, in which the solvent (dispersion medium) is replaced with another solvent and then drying is carried out, encompass a method in which (i) the solvent (dispersion medium) is replaced with a poor solvent having a low boiling point, such as water, alcohol, or acetone, and (ii) the coating material is dried so that the poor solvent is removed and the solid content of the coating material is deposited as the porous layer.

Embodiment 2: Nonaqueous Electrolyte Secondary Battery Laminated Separator

A nonaqueous electrolyte secondary battery laminated separator in accordance with Embodiment 2 of the present invention includes (i) a porous base material containing a polyolefin-based resin as a main component and (ii) a porous layer in accordance with Embodiment 1 of the present invention which porous layer is disposed on at least one surface of the porous base material.

<Porous Base Material>

The porous base material is a porous base material containing a polyolefin-based resin as a main component, and can be a porous film containing a polyolefin-based resin as a main component. The porous film is preferably a microporous film. Specifically, the porous film preferably (i) has therein pores connected to one another and (ii) contains a polyolefin-based resin as a main component so that a gas and a liquid can pass through the porous film from one surface of the porous film to the other. The porous film can include a single layer or a plurality of layers.

The porous film (porous base material) containing a polyolefin-based resin as a main component" herein means that a polyolefin-based resin component is contained in the porous film at a proportion of ordinarily not less than 50% by volume, preferably not less than 90% by volume, and more preferably not less than 95% by volume of an entire portion of the porous film. The polyolefin-based resin contained in the porous film preferably contains a high molecular weight component having a weight-average molecular weight of $5 \times 10^5$ to $15 \times 10^6$. It is preferable that a polyolefin-based resin having a weight-average molecular weight of not less than 1,000,000 be contained as a polyolefin-based resin in the porous film. This is because, in such a case, there can be an increase in (i) strength of an entire portion of the porous film, i.e., an entire portion of a nonaqueous electrolyte secondary battery laminated separator, and (ii) strength of an entire portion of a nonaqueous electrolyte secondary battery laminated separator which includes the porous film and the porous layer.

Examples of the polyolefin-based resin encompass high molecular weight homopolymers (such as polyethylene, polypropylene, and polybutene) and high molecular weight copolymers (such as ethylene-propylene copolymer) produced through polymerization of ethylene, propylene, 1-butene, 4-methyl-1-pentene, or 1-hexene. The porous film is a layer which includes one of these polyolefin-based resins and/or two or more of these polyolefin-based resins. A high molecular weight polyethylene-based resin containing ethylene as a main component is particularly preferable in view of the fact that such a polyethylene-based resin can prevent (shutdown) the flow of an excessively large current at a low temperature. Note that the porous film can contain any component other than the polyolefin-based resin, provided that the component does not impair the function of the porous film.

An air permeability of the porous film in terms of Gurley values is ordinarily 30 sec/100 cm$^3$ to 500 sec/100 cm$^3$, and preferably 50 sec/100 cm$^3$ to 300 sec/100 cm$^3$. If the air permeability of the porous film falls within these ranges, sufficient ion permeability can be imparted to (i) a nonaqueous electrolyte secondary battery separator in a case where the porous film is used as the nonaqueous electrolyte secondary battery separator or (ii) a nonaqueous electrolyte secondary battery laminated separator in a case where the porous film is used as a member of the nonaqueous electrolyte secondary battery laminated separator including a porous layer described later.

In regard to a thickness of the porous film, a less thickness can cause energy density of the battery to be higher. Therefore, the thickness of the porous film is preferably not more than 20 µm, more preferably not more than 16 µm, and still more preferably not more than 11 µm. In view of film strength, the thickness of the porous film is preferably not less than 4 µm. That is, the thickness of the porous film is preferably 4 µm to 20 µm.

A method of producing the porous film can be any publicly known method, and is not limited to any particular one. For example, as disclosed in Japanese Patent No. 5476844, the porous film can be produced by (i) adding a filler to a thermoplastic resin, (ii) forming, into a film, the thermoplastic resin containing the filler, and then (iii) removing the filler.

Specifically, in a case where, for example, the porous film is made of polyolefin resin containing ultra-high molecular weight polyethylene and low molecular weight polyolefin which has a weight-average molecular weight of not more than 10,000, the porous film is preferably produced by, in view of production costs, a method including the following steps (1) through (4):
(1) kneading 100 parts by weight of ultra-high molecular weight polyethylene, 5 parts by weight to 200 parts by weight of low molecular weight polyolefin having a weight-average molecular weight of not more than 10,000, and 100 parts by weight to 400 parts by weight of an inorganic filler such as calcium carbonate, so that a polyolefin resin composition is obtained;
(2) forming the polyolefin resin composition into a sheet;
(3) removing the inorganic filler from the sheet obtained in the step (2); and
(4) stretching the sheet obtained in the step (3).

Alternatively, the porous film can be produced through a method disclosed in either of the above-described Patent Literatures.

Alternatively, the porous film in accordance with an embodiment of the present invention can be a commercially available product having the above-described characteristics.

<Nonaqueous Electrolyte Secondary Battery Laminated Separator Production Method>

The nonaqueous electrolyte secondary battery laminated separator in accordance with an embodiment of the present invention can be produced by, for example, a method in which the porous film containing polyolefin as a main component is used as a base material in the above-described method of producing the porous layer in accordance with an embodiment of the present invention.

<Physical Properties of Nonaqueous Electrolyte Secondary Battery Laminated Separator>

In regard to a thickness of the nonaqueous electrolyte secondary battery laminated separator, a less thickness can allow energy density of the battery to be higher, and is therefore preferable. However, a less thickness also leads to less strength, and there is therefore a limitation on a reduction in the thickness during production of the nonaqueous electrolyte secondary battery laminated separator. In view of these factors, the nonaqueous electrolyte secondary battery laminated separator has a thickness of preferably not more than 50 µm, more preferably not more than 25 µm, and still more preferably not more than 20 µm. In addition, the nonaqueous electrolyte secondary battery laminated separator preferably has a thickness of not less than 5 µm.

An air permeability of the nonaqueous electrolyte secondary battery laminated separator in terms of Gurley values is preferably 30 sec/100 cm$^3$ to 1000 sec/100 cm$^3$, and more preferably 50 sec/100 cm$^3$ to 800 sec/100 cm$^3$. In a case where the laminated body has an air permeability falling within these ranges, the laminated body used as a nonaqueous electrolyte secondary battery separator can have sufficient ion permeability. If the air permeability is above these ranges, then the laminated body, which is used as a nonaqueous electrolyte secondary battery separator, cannot have sufficient ion permeability. This may cause a deterioration in battery characteristic of a nonaqueous electrolyte secondary battery. Meanwhile, if the air permeability is below these ranges, then it means that the laminated body has a high porosity and that a laminated structure is therefore rough. This poses a risk that strength of the laminated body may decrease, so that shape stability particularly at a high temperature may be insufficient.

Note that the nonaqueous electrolyte secondary battery laminated separator can include, as needed, a publicly known porous film(s) such as an adhesive layer and/or a protection layer in addition to the porous film and the porous layer, provided that the object of an embodiment of the present invention is not impaired.

Embodiment 3: Nonaqueous Electrolyte Secondary Battery Member, Embodiment 4: Nonaqueous Electrolyte Secondary Battery A nonaqueous electrolyte secondary battery member in accordance with Embodiment 3 of the present invention is obtained by arranging a cathode, the nonaqueous electrolyte secondary battery insulating porous layer in accordance with Embodiment 1 of the present invention or the nonaqueous electrolyte secondary battery laminated separator in accordance with Embodiment 2 of the present invention, and an anode, the cathode, the nonaqueous electrolyte secondary battery insulating porous layer or the nonaqueous electrolyte secondary battery laminated separator, and the anode being arranged in this order.

A nonaqueous electrolyte secondary battery in accordance with Embodiment 4 of the present invention includes (i) the nonaqueous electrolyte secondary battery insulating porous layer in accordance with Embodiment 1 of the present invention or (ii) the nonaqueous electrolyte secondary battery laminated separator in accordance with Embodiment 2 of the present invention.

A nonaqueous electrolyte secondary battery in accordance with an embodiment of the present invention can be, for example, a nonaqueous secondary battery that achieves an electromotive force through doping and dedoping with lithium, and can include a nonaqueous electrolyte secondary battery member including a cathode, a nonaqueous electrolyte secondary battery insulating porous layer in accordance with an embodiment of the present invention, and an anode, the cathode, the nonaqueous electrolyte secondary battery insulating porous layer, and the anode being laminated in this order. Alternatively, the nonaqueous electrolyte secondary battery in accordance with an embodiment of the present invention can be, for example, a nonaqueous secondary battery that achieves an electromotive force through doping and dedoping with lithium, and can be a lithium ion secondary battery that includes a nonaqueous electrolyte secondary battery member including a cathode, a nonaqueous electrolyte secondary battery insulating porous layer in accordance with an embodiment of the present invention, a porous base material, and an anode which are laminated in this order, that is, a lithium ion secondary battery that includes a nonaqueous electrolyte secondary battery member including a cathode, a nonaqueous electrolyte secondary battery laminated separator in accordance with an embodiment of the present invention, and an anode which are laminated in this order. Note that constituent elements, other than the nonaqueous electrolyte secondary battery separator, of the nonaqueous electrolyte secondary battery are not limited to those described below.

The nonaqueous electrolyte secondary battery in accordance with an embodiment of the present invention is ordinarily configured so that a battery element is enclosed in an exterior member, the battery element including (i) a structure in which the anode and the cathode faces each other via the porous layer in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery is preferably a secondary battery including a nonaqueous electrolyte, and is particularly preferably a lithium ion secondary battery. Note that the doping means occlusion, support, adsorption, or insertion, and means a phenomenon in which lithium ions enter an active material of an electrode (e.g., a cathode).

Since the nonaqueous electrolyte secondary battery member in accordance with an embodiment of the present invention includes the nonaqueous electrolyte secondary battery insulating porous layer in accordance with an embodiment of the present invention or includes the nonaqueous electrolyte secondary battery laminated separator in accordance with an embodiment of the present invention, the nonaqueous electrolyte secondary battery member yields an effect of achieving a nonaqueous electrolyte secondary battery that has a property of having high ion conductivity and an excellent battery characteristic. Since the nonaqueous electrolyte secondary battery in accordance with an embodiment of the present invention includes the nonaqueous electrolyte secondary battery insulating porous layer in accordance with an embodiment of the present invention or includes the nonaqueous electrolyte secondary battery laminated separator in accordance with an embodiment of the present invention, the nonaqueous electrolyte secondary battery yields an effect of having high ion conductivity and an excellent battery characteristic.

<Cathode>

A cathode included in the nonaqueous electrolyte secondary battery member in accordance with an embodiment of the present invention or included in the nonaqueous electrolyte secondary battery in accordance with an embodiment of the present invention is not limited to any particular one, provided that the cathode is one that is typically used as a cathode of a nonaqueous electrolyte secondary battery. Examples of the cathode encompass a cathode sheet having a structure in which an active material layer containing a cathode active material and a binder resin is formed on a current collector. The active material layer can further contain an electrically conductive agent.

The cathode active material is, for example, a material capable of being doped with and dedoped of lithium ions. Specific examples of such a material encompass a lithium complex oxide containing at least one transition metal such as V, Mn, Fe, Co, or Ni.

Examples of the electrically conductive agent encompass (i) carbonaceous materials such as natural graphite, artificial graphite, cokes, carbon black, pyrolytic carbons, carbon fiber, and a fired product of an organic polymer compound, and (ii) the like. It is possible to use (i) only one kind of the above electrically conductive agents or (ii) two or more kinds of the above electrically conductive agents in combination.

Examples of a binding agent encompass (i) fluorine-based resins such as polyvinylidene fluoride, (ii) acrylic resin, and (iii) styrene butadiene rubber. Note that the binding agent serves also as a thickener.

Examples of the cathode current collector encompass electric conductors such as Al, Ni, and stainless steel. Among these, Al is preferable because Al is easily processed into a thin film and is inexpensive.

Examples of a method of producing the cathode sheet encompass: (I) a method in which a cathode active material, an electrically conductive agent, and a binding agent are pressure-molded on a cathode current collector; (II) a method in which (i) a cathode active material, an electrically conductive agent, and a binding agent are formed into a paste with the use of a suitable organic solvent, (ii) a cathode current collector is coated with the paste, and then (iii) the paste is dried and then pressured so that the paste is firmly fixed to the cathode current collector; and (III) the like.

<Anode>

An anode included in the nonaqueous electrolyte secondary battery member in accordance with an embodiment of the present invention or included in the nonaqueous electrolyte secondary battery in accordance with an embodiment of the present invention is not limited to any particular one, provided that the anode is one that is typically used as an anode of a nonaqueous electrolyte secondary battery. Examples of the anode encompass an anode sheet having a structure in which an active material layer containing an anode active material and a binder resin is formed on a current collector. The active material layer can further contain an electrically conductive auxiliary agent.

The anode active material is, for example, a material capable of being doped with and dedoped of lithium ions, lithium metal, lithium alloy, or the like. Specific examples of such a material encompass carbonaceous materials such as natural graphite, artificial graphite, cokes, carbon black, pyrolytic carbons, carbon fiber, and a fired product of an organic polymer compound; chalcogen compounds each capable of being doped with and dedoped of lithium ions at a potential lower than a potential of the cathode, such as oxides and sulfides; metals each alloyed with an alkali metal, such as aluminum (Al), lead (Pb), tin (Sn), bismuth (Bi), and silicon (Si); and cubic compounds having lattice spaces in which alkali metals can be provided, such as intermetallic compounds (AlSb, $Mg_2Si$, $NiSi_2$) and lithium nitrogen compounds ($Li_{3-x}M_xN$ (M: transition metal)). Of the above anode active materials, a carbonaceous material which contains, as a main component, a graphite material such as natural graphite or artificial graphite is more preferable. This is because such a carbonaceous material is high in potential evenness, and a great energy density can be obtained in a case where the carbonaceous material, which is low in average discharge potential, is combined with the cathode. Of the above anode active materials, a mixture of graphite and silicon is still more preferable. An anode active material which is a mixture of graphite and silicon and has an Si to C ratio of not less than 5% by weight is more preferable, and an anode active material which is a mixture of graphite and silicon and has an Si to C ratio of not less than 10% by weight is still more preferable.

The anode current collector is exemplified by Cu, Ni, stainless steel, and the like, among which Cu is more preferable because Cu is not easily alloyed with lithium especially in the case of a lithium ion secondary battery and is easily processed into a thin film.

Examples of a method of producing the anode sheet encompass: (I) a method in which an anode active material is pressure-molded on an anode current collector; (II) a method in which (i) an anode active material is formed into a paste with the use of a suitable organic solvent, (ii) an anode current collector is coated with the paste, and then (iii) the paste is dried and then pressured so that the paste is firmly fixed to the anode current collector; and (III) the like. The paste preferably contains the electrically conductive auxiliary agent and the binding agent.

<Nonaqueous Electrolyte>

A nonaqueous electrolyte in a nonaqueous electrolyte secondary battery in accordance with an embodiment of the present invention is not limited to any particular one, provided that the nonaqueous electrolyte is one that is typically used for a nonaqueous electrolyte secondary battery. The nonaqueous electrolyte can be one prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, $LiAlCl_4$, and the like. It is possible to use (i) only one kind of the above lithium salts or (ii) two or more kinds of the above lithium salts in combination.

Examples of the organic solvent to be contained in the nonaqueous electrolyte encompass carbonates, ethers, esters, nitriles, amides, carbamates, a sulfur-containing compound, a fluorine-containing organic solvent obtained by introducing a fluorine group into any of these organic solvents, and the like. It is possible to use (i) only one kind of the above organic solvents or (ii) two or more kinds of the above organic solvents in combination.

<Nonaqueous Electrolyte Secondary Battery Member Production Method and Nonaqueous Electrolyte Secondary Battery Production Method>

A nonaqueous electrolyte secondary battery member in accordance with an embodiment of the present invention can be produced by, for example, arranging a cathode, a porous layer in accordance with an embodiment of the present invention or a nonaqueous electrolyte secondary battery laminated separator in accordance with an embodiment of the present invention, and an anode in this order.

A nonaqueous electrolyte secondary battery in accordance with an embodiment of the present invention can be produced by, for example, (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container under reduced pressure.

EXAMPLES

The following description more specifically discusses an embodiment of the present invention with reference to the following Examples and Comparative Examples. Note, however, that the present invention is not limited by the Examples.

[Method for Measuring Physical Properties and the Like]

Physical properties and the like of a laminated separator, a separator base material (porous base material), a coating film (porous layer), and a polymer solution of each of Examples and Comparative Examples were measured by the following method.

(1) Thickness (Unit: μm)

In conformity with a JIS standard (K 7130-1992), a thickness of the laminated separator and a thickness of the separator base material (porous base material) were each measured with the use of High-Resolution Digimatic Measuring Unit manufactured by Mitutoyo Corporation.

(2) Air Permeability Measured by Gurley Method (sec/100 $cm^3$)

In conformity with a JIS P 8117, an air permeability of the laminated separator was measured with the use of a digital timer Gurley densometer manufactured by YASUDA SEIKI SEISAKUSHO, LTD.

(3) Viscosity (dl/g or cp)

An intrinsic viscosity of a para-aramid prepared in each of Examples and Comparative Examples was measured by the following method. The intrinsic viscosity was found, in accordance with a ratio between flow times found for (i) a solution obtained by dissolving 0.5 g of a para-aramid in 100 ml of 96%-to-98% sulfuric acid and (ii) 96%-to-98% sulfuric acid, respectively, based on the following equation:

intrinsic viscosity[unit: dl/g]=$\ln(T/T_0)/C$ where T and $T_0$ are the respective flow times of (i) the para-aramid sulfuric acid solution and (ii) the sulfuric acid; and C is a para-aramid concentration (g/dl) in the para-aramid sulfuric acid solution.

A viscosity of an aromatic polyester solution prepared in each of Examples and Comparative Examples was measured at 23° C. with the use of a B-type viscometer "Model TVL-20" manufactured by Toki Sangyo Co. Ltd.

(4) Heat Shape Retention Rate (%)

A heat shape retention rate of a porous layer provided to a porous base material was calculated by carrying out a 100° C. heat shrinkage test. Specifically, a sample having an 8 cm square was cut out from a laminated separator, and on a surface of a porous layer of the sample thus cut out, a line of a 6 cm square was drawn on an inner side of an outer edge of the 8 cm square. The sample was heated at 100° C. for 1 hour while being sandwiched between pieces of paper. Then, a length of the drawn line was measured, and the heat shape retention rate was calculated based on the following equation:

heat shape retention rate (%)=(length of line after heating/length of line before heating)×100

Example 1

<Synthesis of Para-Aramid>

PPTA was synthesized with the use of a 5-liter separable flask having a stirring blade, a thermometer, a nitrogen incurrent canal, and a powder addition port.

The separable flask was sufficiently dried, and then 4200 g of NMP was introduced into the separable flask. Then, 272.65 g of calcium chloride, which had been dried at 200° C. for 2 hours, was added, and then a temperature inside the separable flask was increased to 100° C. After the calcium chloride was completely dissolved, the temperature inside the flask was returned to room temperature, and then 132.91 g of PPD was added. Then, the PPD was completely dissolved, so that a solution was obtained. While a temperature of the solution was maintained at 20±2° C., 243.32 g of TPC was added, to the solution, in ten separate portions at approximately 5-minute intervals. Then, while a temperature of the resultant solution was maintained at 20±2° C., the solution was matured for 1 hour. Then, the solution was stirred under reduced pressure for 30 minutes to eliminate air bubbles, so that a PPTA solution (polymer solution) was obtained. Part (as a sample) of the polymer solution was reprecipitated with the use of water, and was then extracted as a polymer, so that PPTA was obtained. Then, an intrinsic viscosity of the PPTA thus obtained was measured, and was 1.97 dl/g. The PPTA solution thus obtained will be referred to as "solution A1", and the PPTA thus obtained will be referred to as "polymer A1". Note that HSP of A1 was calculated to be $\delta D=23.0$, $\delta P=15.5$, and $\delta H=9.9$.

<Synthesis of Aromatic Polyester>

Into a reactor including a stirring apparatus, a torque meter, a nitrogen incurrent canal, a thermometer, and a reflux condenser, 941 g (5.0 mol) of 2-hydroxy-6-naphthoic acid, 377.9 g (2.5 mol) of 4-hydroxyacetanilide, 415.3 g (2.5 mol) of isophthalic acid, and 867.8 g (8.5 mol) of acetic anhydride were introduced. Then, a gas inside the reactor was sufficiently replaced with a nitrogen gas, and then a temperature inside the reactor was increased to 150° C. under a nitrogen gas airflow over a period of 15 minutes. Then, while the temperature (150° C.) was maintained, a reaction solution was refluxed for 3 hours.

Then, while an acetic acid distilled as a byproduct and an unreacted acetic anhydride were distilled away, the temperature was increased to 300° C. over a period of 170 minutes. At a time point at which an increase in torque was observed, it was determined that a reaction had ended. Then, a resultant content was extracted. The resultant content was cooled to room temperature, and then was crushed with the use of a crusher. Then, a wholly aromatic polyester powder having a relatively low molecular weight was obtained.

A temperature, at which the wholly aromatic polyester powder having a relatively low molecular weight started flowing, was measured with the use of a flow tester "Model CFT-500" manufactured by Shimadzu Corporation, and was 197° C.

Then, the wholly aromatic polyester powder was subjected to solid phase polymerization by being subjected to a heat treatment at 180° C. in a nitrogen atmosphere for 5 hours, and then being subjected to a heat treatment at 250° C. in a nitrogen atmosphere for 5 hours. A temperature, at which the wholly aromatic polyester having a relatively high molecular weight after the solid phase polymerization started flowing, was measured as described above, and was 302° C.

To 460 g of NMP, 40 g of the obtained wholly aromatic polyester having a relatively high molecular weight was added. Then, a resultant mixture was heated at 100° C. for 2 hours, so that a liquid composition was obtained. Then, a viscosity of the liquid composition was measured at a temperature of 23° C. with the use of a B-type viscometer "Model TVL-20" (Rotor No. 21, rotation speed: 5 rpm) manufactured by Toki Sangyo Co. Ltd., and was 800 cP. The wholly aromatic polyester solution thus obtained will be referred to as "solution B1", and the wholly aromatic polyester thus obtained will be referred to as "polymer B1". HSP of B1 was calculated to be $\delta D=20.9$, $\delta P=8.3$, and $\delta H=4.7$. An HSP distance (Ra) between A1 and B1 was 9.79 $MPa^{1/2}$.

<Preparation of Coating Solution>

The solution A1 and the solution B1 were mixed to form a mixed solution so that a mixing ratio, (polymer A1): (polymer B1), would be 100 parts by weight:100 parts by weight. Then, a resultant mixture was diluted with NMP so that a solid content concentration would be δ%. Then, the resultant mixture was stirred with the use of a homogenizer, and was then treated twice at 50 MPa with the use of a pressure type dispersing device, so that a coating solution 1 was obtained.

<Production of Laminated Separator>

A polyethylene separator base material (air permeability: 120 sec/100 cm³, thickness: 15 μm, hereinafter abbreviated as a "PE separator base material") was attached to a glass plate. Then, with the use of a bar coater manufactured by Tester Sangyo Co., Ltd., a surface (one surface) of the PE separator base material was coated with the coating solution 1. Then, the resultant coated product was placed, for 1 minute, in a humidifying oven having a relative humidity of 80% at 60° C., was washed with the use of ion exchange water, and was then dried with the use of an oven at 80° C., so that a laminated separator was obtained. The laminated separator had an air permeability of 964 sec/100 cm³.

Example 2

<Synthesis of Aromatic Polyimide>

Into a reactor including a stirring apparatus, a torque meter, a nitrogen incurrent canal, a thermometer, and a reflux condenser, 192 g of trimellitic anhydride (TMA), 250 g of diphenylmethane diisocyanate (MDI), and 1.2 g of potassium fluoride together with NMP were introduced so that a solid content concentration would be 15%. A resultant mixture was stirred at 130° C. for 5 hours and then cooled to room temperature. The polyimide resin solution thus obtained will be referred to as "solution A2", and the wholly aromatic polyimide thus obtained will be referred to as "polymer A2". HSP of A2 was calculated to be $\delta H=22.2$, $\delta P=9.9$, and $\delta H=5.7$.

<Synthesis of Aromatic Polyester>

Into a reactor including a stirring apparatus, a torque meter, a nitrogen incurrent canal, a thermometer, and a reflux condenser, 248.6 g (1.8 mol) of 4-hydroxybenzoic acid, 468.6 g (3.1 mol) of 4-hydroxyacetanilide, 681.1 g (4.1 mol) of isophthalic acid, 110.1 g (1.0 mol) of hydrochinone, and 806.5 g (7.90 mol) of acetic anhydride were introduced.

Then, a gas inside the reactor was sufficiently replaced with a nitrogen gas, and then a temperature inside the reactor was increased to 150° C. under a nitrogen gas airflow over a period of 15 minutes. Then, while the temperature (150° C.) was maintained, a reaction solution was refluxed for 3 hours.

Then, while an acetic acid distilled as a byproduct and an unreacted acetic anhydride were distilled away, the temperature was increased to 300° C. over a period of 300 minutes. At a time point at which an increase in torque was observed, it was determined that a reaction had ended. Then, a resultant content was extracted. The resultant content was cooled to room temperature, and then was crushed with the use of a crusher. Then, an aromatic polyester powder having a relatively low molecular weight was obtained. Then, a temperature, at which the aromatic polyester powder started flowing, was measured with the use of a flow tester "Model CFT-500" manufactured by Shimadzu Corporation, and was 253.2° C. Furthermore, the aromatic polyester powder was subjected to solid phase polymerization by being subjected to a heat treatment at 290° C. in a nitrogen atmosphere for 3 hours.

To 400 g of NMP, 100 g of the obtained liquid crystalline polyester was added. Then, a resultant mixture was heated at 100° C. for 2 hours, so that a liquid composition was obtained. Then, a viscosity of the liquid composition was measured at a temperature of 23° C. with the use of a B-type viscometer "Model TVL-20" (Rotor No. 22, rotation speed: 20 rpm) manufactured by Toki Sangyo Co. Ltd., and was 3000 cP. The wholly aromatic polyester solution thus obtained will be referred to as "solution B2", and the wholly aromatic polyester thus obtained will be referred to as "polymer B2". HSP of B2 was calculated to be $\delta D=20.4$, $\delta P=10.6$, and $\delta H=5.1$. An HSP distance (Ra) between A2 and B2 was 3.74 $MPa^{1/2}$.

<Preparation of Coating Solution>

The solution A2 and the solution B2 were mixed to form a mixed solution so that a mixing ratio, (polymer A2): (polymer B2), would be 100 parts by weight:100 parts by weight. Then, a resultant mixed solution was diluted with NMP so that a solid content concentration would be 6%. Then, the resultant mixed solution was stirred with the use of a homogenizer, and was then treated twice at 50 MPa with the use of a pressure type dispersing device, so that a coating solution 2 was obtained.

<Production of Laminated Separator>

A PE separator base material (air permeability: 120 sec/100 cm³, thickness: 15 μm) was attached to a glass plate. Then, with the use of a bar coater manufactured by Tester Sangyo Co., Ltd., a surface (one surface) of the PE separator base material was coated with the coating solution 2. Then, the resultant coated product was placed, for 1 minute, in a humidifying oven having a relative humidity of 80% at 60° C., was washed with the use of ion exchange water, and was then dried with the use of an oven at 80° C., so that a laminated separator was obtained. The laminated separator had an air permeability of 405 sec/100 cm³.

Comparative Example 1

A laminated separator was obtained by a method similar to the method described in Example 1 except that the coating solution A1 was used instead of the coating solution 1. The laminated separator had an air permeability of 5521 sec/100 cm³.

Comparative Example 2

A laminated separator was obtained by a method similar to the method described in Example 1 except that the coating solution A2 was used instead of the coating solution 1. The laminated separator had an air permeability of more than 9999 sec/100 cm³, and thus it was impossible to measure the air permeability.

Comparative Example 3

A laminated separator was obtained by a method similar to the method described in Example 1 except that the coating solution B1 was used instead of the coating solution 1. The laminated separator had an air permeability of more than 9999 sec/100 cm³, and thus it was impossible to measure the air permeability.

Example 3

<Preparation of Coating Solution>

The solution A1 and the solution B1 were mixed to form a mixed solution so that a mixing ratio, (polymer A1): (polymer B1), would be 100 parts by weight:100 parts by weight. Then, relative to 100 parts by weight of the polymer A1, 100 parts by weight of an alumina powder having an average particle size of 0.02 μm and 100 parts by weight of an alumina powder having an average particle size of 0.3 μm were added to the mixed solution. Then, a resultant mixture was diluted with NMP so that a solid content concentration would be 5.3%. Then, the resultant mixture was stirred with the use of a homogenizer, and was then treated twice at 50 MPa with the use of a pressure type dispersing device, so that a coating solution 3 was obtained.

<Production of Laminated Separator>

A laminated separator was obtained by a method similar to the method described in Example 1 except that the coating solution 3 was used instead of the coating solution 1. The laminated separator had an air permeability of 198 sec/100 cm³.

Example 4

<Preparation of Coating Solution>

The solution A1 obtained in Example 1 and the solution B2 obtained in Example 2 were mixed to form a mixed solution, and an alumina powder was added to the mixed solution, so that a coating solution was prepared. An HSP distance (Ra) between A1 and B2 which HSP distance (Ra) had been found in accordance with the HSP of A1 and the HSP of B2 was 8.60 $MPa^{1/2}$.

Specifically, the solution A1 and the solution B2 were mixed to form a mixed solution so that a mixing ratio, (polymer A1):(polymer B2), would be 100 parts by weight: 100 parts by weight. Then, relative to 100 parts by weight of the polymer A1, 200 parts by weight of an alumina powder having an average particle size of 0.02 μm and 200 parts by weight of an alumina powder having an average particle size of 0.3 μm were added to the mixed solution. Then, a resultant mixture was diluted with NMP so that a solid content concentration would be 6.0%. Then, the resultant mixture was stirred with the use of a homogenizer, and was then treated twice at 50 MPa with the use of a pressure type dispersing device, so that a coating solution 4 was obtained.

<Production of Laminated Separator>

A laminated separator was obtained by a method similar to the method described in Example 1 except that the coating solution 4 was used instead of the coating solution 1. The laminated separator had an air permeability of 236 sec/100 cm³.

Comparative Example 4

<Preparation of Coating Solution>

To 100 parts by weight of the polymer A1, 100 parts by weight of an alumina powder having an average particle size of 0.02 μm and 100 parts by weight of an alumina powder having an average particle size of 0.3 μm were added. Then, a resultant mixture was diluted with NMP so that a solid content concentration would be 6.0%. Then, the resultant mixture was stirred with the use of a homogenizer, and was then treated twice at 50 MPa with the use of a pressure type dispersing device, so that a coating solution 5 was obtained.

<Production of Laminated Separator>

A laminated separator was obtained by a method similar to the method described in Example 1 except that the coating solution 5 was used instead of the coating solution 1. The laminated separator had an air permeability of 270 sec/100 cm$^3$.

Example 5

<Preparation of Coating Solution>

The solution A1 obtained in Example 1 and the solution A2 obtained in Example 2 were mixed to form a mixed solution, and an alumina powder was added to the mixed solution, so that a coating solution was prepared. An HSP distance (Ra) between A1 and A2 which HSP distance (Ra) had been found in accordance with the HSP of A1 and the HSP of A2 was 7.18 MPa$^{1/2}$.

Specifically, the solution A1 and the solution A2 were mixed to form a mixed solution so that a mixing ratio, (polymer A1):(polymer A2), would be 100 parts by weight: 100 parts by weight. Then, relative to 100 parts by weight of the polymer A1, 200 parts by weight of an alumina powder having an average particle size of 0.02 μm and 200 parts by weight of an alumina powder having an average particle size of 0.3 μm were added to the mixed solution. Then, a resultant mixture was diluted with NMP so that a solid content concentration would be 6.0%. Then, the resultant mixture was stirred with the use of a homogenizer, and was then treated twice at 50 MPa with the use of a pressure type dispersing device, so that a coating solution 6 was obtained.

<Production of Laminated Separator>

A laminated separator was obtained by a method similar to the method described in Example 1 except that the coating solution 6 was used instead of the coating solution 1. The laminated separator had an air permeability of 213 sec/100 cm$^3$.

Example 6

<Preparation of Meta-Aramid Solution>

Into a 5-liter (1) separable flask having a stirring blade, a thermometer, a nitrogen incurrent canal, and a powder addition port, 222 g of methaphenylenediamine and 3300 g of NMP were introduced. Then, a resultant mixture was stirred and dissolved. Then, into the resultant mixture, a solution obtained by dissolving, into 1000 g of NMP, 419 g of isophthalic acid chloride which had been melted by being heated to 70° C. was dropped. Then, a resultant mixture was reacted at 23° C. for 60 minutes. The meta-aramid resin solution thus obtained will be referred to as "solution B3", and the meta-aramid thus obtained will be referred to as "polymer B3". HSP of B3 was calculated to be δD=22.6, δP=14.1, and δH=7.7. An HSP distance (Ra) between A1 and B3 was 2.73 MPa$^{1/2}$.

<Preparation of Coating Solution>

The solution A1 and the solution B3 were mixed to form a mixed solution so that a mixing ratio, (polymer A1):(polymer B3), would be 100 parts by weight:100 parts by weight. Then, relative to 100 parts by weight of the polymer A1, 200 parts by weight of an alumina powder having an average particle size of 0.02 μm and 200 parts by weight of an alumina powder having an average particle size of 0.3 μm were added to the mixed solution. Then, a resultant mixture was diluted with NMP so that a solid content concentration would be 6.0%. Then, the resultant mixture was stirred with the use of a homogenizer, and was then treated twice at 50 MPa with the use of a pressure type dispersing device, so that a coating solution 7 was obtained.

<Production of Laminated Separator>

A laminated separator was obtained by a method similar to the method described in Example 1 except that the coating solution 7 was used instead of the coating solution 1. The laminated separator had an air permeability of 235 sec/100 cm$^3$.

Comparative Example 5

<Synthesis of Aromatic Polyester>

Into a reactor including a stirring apparatus, a torque meter, a nitrogen incurrent canal, a thermometer, and a reflux condenser, 1976 g (10.5 mol) of 2-hydroxy-6-naphthoic acid, 1474 g (9.75 mol) of 4-hydroxyacetanilide, 1620 g (9.75 mol) of isophthalic acid, and 2374 g (23.25 mol) of acetic anhydride were introduced. Then, a gas inside the reactor was sufficiently replaced with a nitrogen gas, and then a temperature inside the reactor was increased to 150° C. under a nitrogen gas airflow over a period of 15 minutes. Then, while the temperature (150° C.) was maintained, a reaction solution was refluxed for 3 hours.

Then, while an acetic acid distilled as a byproduct and an unreacted acetic anhydride were distilled away, the temperature was increased to 300° C. over a period of 170 minutes. At a time point at which an increase in torque was observed, it was determined that a reaction had ended. Then, a resultant content was extracted. The resultant content was cooled to room temperature, and then was crushed with the use of a crusher. Then, a liquid crystalline polyester powder having a relatively low molecular weight was obtained. Then, a temperature, at which the liquid crystalline polyester powder started flowing, was measured with the use of a flow tester "Model CFT-500" manufactured by Shimadzu Corporation, and was 235° C. Furthermore, the liquid crystalline polyester powder was subjected to solid phase polymerization by being subjected to a heat treatment at 223° C. in a nitrogen atmosphere for 3 hours. A temperature, at which liquid crystalline polyester obtained after the solid phase polymerization started flowing, was 270° C.

To 400 g of NMP, 100 g of the obtained liquid crystalline polyester was added. Then, a resultant mixture was heated at 100° C. for 2 hours, so that a liquid composition was obtained. Then, a viscosity of the liquid composition was measured at a temperature of 23° C. with the use of a B-type viscometer "Model TVL-20" (Rotor No. 22, rotation speed: 20 rpm) manufactured by Toki Sangyo Co. Ltd., and was 3200 cP. The wholly aromatic polyester solution thus obtained will be referred to as "solution B4", and the wholly aromatic polyester thus obtained will be referred to as "polymer B4". HSP of B4 was calculated to be δD=18.7, δP=9.3, and δH=4.9. An HSP distance (Ra) between A1 and B4 was 11.78 MPa$^{1/2}$.

<Preparation of Coating Solution>

The solution A1 obtained in Example 1 and the solution B4 were mixed to form a mixed solution so that a mixing ratio, (polymer A1):(polymer B4), would be 100 parts by weight:100 parts by weight. Then, a resultant mixed solution was diluted with NMP so that a solid content concentration would be 6.0%. Then, the resultant mixed solution was stirred with the use of a homogenizer, and was then treated twice at 50 MPa with the use of a pressure type dispersing device, so that a coating solution 8 was obtained.

<Production of Laminated Separator>

A laminated separator was obtained by a method similar to the method described in Example 1 except that the coating solution 8 was used instead of the coating solution 1. The laminated separator had an air permeability of more than 9999 sec/100 cm$^3$, and thus it was impossible to measure the air permeability.

Comparative Example 6

<Preparation of Coating Solution>

The solution A1 obtained in Example 1 and the solution B4 obtained in Comparative Example 5 were mixed to form a mixed solution so that a mixing ratio, (polymer A1):(polymer B4), would be 100 parts by weight:100 parts by weight. Then, relative to 100 parts by weight of the polymer A1, 200 parts by weight of an alumina powder having an average particle size of 0.02 μm and 200 parts by weight of an alumina powder having an average particle size of 0.3 μm were added to the mixed solution. Then, a resultant mixture was diluted with NMP so that a solid content concentration would be 6.0%. Then, the resultant mixture was stirred with the use of a homogenizer, and was then treated twice at 50 MPa with the use of a pressure type dispersing device, so that a coating solution 9 was obtained.

<Production of Laminated Separator>

A laminated separator was obtained by a method similar to the method described in Example 1 except that the coating solution 9 was used instead of the coating solution 1. Note, however, that it was impossible for a coating layer to retain its shape. This made it impossible to form a film.

Comparative Example 7

<Preparation of Coating Solution>

Commercially available polyvinyl alcohol (hereinafter abbreviated as "PVA", saponification rate: 100%) was dissolved in NMP, so that a PVA solution was obtained. The PVA solution will be referred to as "solution B5", and the PVA will be referred to as "polymer B5". HSP of B5 was calculated to be $\delta D=15.9$, $\delta P=8.1$, and $\delta H=18.8$. An HSP distance (Ra) between A1 and B5 was 18.32 MPa$^{1/2}$.

The solution A1 obtained in Example 1 and the solution B5 were mixed to form a mixed solution so that a mixing ratio, (polymer A1):(polymer B5), would be 100 parts by weight:100 parts by weight. Then, a resultant mixture was diluted with NMP so that a solid content concentration would be 6.0%. Then, the resultant mixture was stirred with the use of a homogenizer, so that a coating solution 10 was obtained. The coating solution 10 was phase-separated. This made it impossible to carry out coating.

CONCLUSION

Table 1 below describes an arrangement of the porous layer of each of the laminated separators produced in Examples 1 through 6 and Comparative Examples 1 through 7, the HSP distance (Ra) between the resin A and the resin B which are contained in the porous layer, film formability of the porous layer, and the air permeability of the laminated separator.

TABLE 1

| | Arrangement of porous layer | | | | | Film | Air |
|---|---|---|---|---|---|---|---|
| | Resin A | Resin B | Filler | Ra*[1] | Base material | formability | permeability*[2] |
| Example 1 | Aramid | A1 Polyester | B1 | — | 9.79 | PE base material | Good | 964 |
| Example 2 | Polyimide | A2 Polyester | B2 | — | 3.74 | PE base material | Good | 405 |
| Comparative Example 1 | Aramid | A1 — | — | — | — | PE base material | Good | 5521 |
| Comparative Example 2 | Polyimide | A2 — | — | — | — | PE base material | Good | >9999 |
| Comparative Example 3 | — | — Polyester | B1 | — | — | PE base material | Good | >9999 |
| Comparative Example 5 | Aramid | A1 Polyester | B4 | — | 11.78 | PE base material | Good | >9999 |
| Comparative Example 7 | Aramid | A1 Polyvinyl alcohol | B5 | — | 18.32 | PE base material | Film formation was impossible | — |
| Example 3 | Aramid | A1 Polyester | B1 | Alumina | 9.79 | PE base material | Good | 198 |
| Example 4 | Aramid | A1 Polyester | B2 | Alumina | 8.60 | PE base material | Good | 236 |
| Example 5 | Aramid | A1 Polyimide | A2 | Alumina | 7.18 | PE base material | Good | 213 |
| Example 6 | Aramid | A1 Meta-aramid | B3 | Alumina | 2.73 | PE base material | Good | 235 |
| Comparative Example 4 | Aramid | A1 — | — | Alumina | — | PE base material | Good | 270 |
| Comparative Example 6 | Aramid | A1 Polyester | B4 | Alumina | 11.78 | PE base material | Film formation was impossible | — |

*[1]unit: 10 MPa$^{1/2}$
*[2]unit: sec/100 cm$^3$

Examples 1 and 2, and Comparative Examples 1 through 3, 5, and 7 are each an example of a porous layer containing no filler. As shown in Table 1, the laminated separators produced in Examples 1 and 2, in each of which the porous layer contained the resin A and the resin B which have therebetween an HSP distance (Ra) of not more than 10 $MPa^{1/2}$, were each good in film formability of the porous layer and highly permeable to air. In contrast, the laminated separators produced in Comparative Examples 1 through 3, in each of which the porous layer contained only one kind of resin, were each less permeable to air. Further, the laminated separator produced in Comparative Example 5, in which the porous layer contained the resin A and the resin B which have therebetween an HSP distance (Ra) of not less than 10 $MPa^{1/2}$, was less permeable to air than the laminated separators produced in Examples 1 and 2. Meanwhile, according to Comparative Example 7, in which the porous layer contained the resin A and the resin B which have therebetween an HSP distance (Ra) of not less than 10 $MPa^{1/2}$, it was impossible for the coating layer to retain its shape. This made it impossible to form a film.

Examples 3 through 6, and Comparative Examples 4 and 6 are each an example of a porous layer containing a filler. As shown in Table 1, the laminated separators produced in Examples 3 through 6, in each of which the porous layer contained the resin A and the resin B which have therebetween an HSP distance (Ra) of not more than 10 $MPa^{1/2}$, were each good in film formability of the porous layer and highly permeable to air. In contrast, the laminated separator produced in Comparative Example 4, in which the porous layer contained only one kind of resin, was less permeable to air than the laminated separators produced in Examples 3 through 6. Meanwhile, according to Comparative Example 6, in which the porous layer contained the resin A and the resin B which have therebetween an HSP distance (Ra) of not less than 10 $MPa^{1/2}$, it was impossible for the coating layer to retain its shape. This made it impossible to form a film.

[Other Evaluation of Laminated Separator]

<Thickness of Laminated Separator>

Respective thicknesses of the laminated separators produced in Examples 1 through 6 and Comparative Examples 1 through 7 were measured. As a result of the measurement, the laminated separators produced in Examples 1 through 6 and Comparative Examples 1 through 7 each had a thickness of approximately 20 μm.

<Heat Resistance of Laminated Separator>

The laminated separators obtained in Examples 1 through 6 were subjected to the 100° C. heat shrinkage test. As a result, the laminated separators obtained in all the Examples each had a heat shape retention rate of not less than 99%. That is, the laminated separators obtained in all the Examples were highly heat-resistant. Such a result reveals that the laminated separators obtained in Examples 1 through 6 had excellent ion permeability while maintaining heat resistance of a conventional porous layer containing one kind of heat-resistant resin.

<Performance of Nonaqueous Electrolyte Secondary Battery Including Laminated Separator>

It was confirmed that a laminate battery produced with the use of such a laminated separator as described above had a property of having a low resistance and an excellent cycle characteristic.

INDUSTRIAL APPLICABILITY

A laminated separator including a porous layer in accordance with an embodiment of the present invention is excellent in heat resistance and ion permeability. Thus, the porous layer in accordance with an embodiment of the present invention, a nonaqueous electrolyte secondary battery laminated separator in accordance with an embodiment of the present invention, and a nonaqueous electrolyte secondary battery member in accordance with an embodiment of the present invention can be widely used in the field of production of a nonaqueous electrolyte secondary battery.

The invention claimed is:

1. A nonaqueous electrolyte secondary battery insulating porous layer comprising:
   a resin A; and
   a resin B,
   the resin A and the resin B being a combination of two kinds of resins that have the greatest total weight of resins contained in the nonaqueous electrolyte secondary battery insulating porous layer,
   wherein the resin A and the resin B are each an aromatic polymer; and
   the resin A and the resin B having therebetween a Hansen solubility parameter distance (HSP distance) (Ra) of not more than 10 $MPa^{1/2}$.

2. The nonaqueous electrolyte secondary battery insulating porous layer as set forth in claim 1, wherein the nonaqueous electrolyte secondary battery insulating porous layer has an air permeability of not more than 1000 sec/100 $cm^3$.

3. A nonaqueous electrolyte secondary battery laminated separator comprising:
   a porous base material containing a polyolefin-based resin as a main component; and
   a nonaqueous electrolyte secondary battery insulating porous layer recited in claim 1, the nonaqueous electrolyte secondary battery insulating porous layer being disposed on at least one surface of the porous base material.

4. A nonaqueous electrolyte secondary battery member comprising:
   a cathode;
   a nonaqueous electrolyte secondary battery insulating porous layer recited in claim 1; and
   an anode,
   the cathode, the nonaqueous electrolyte secondary battery insulating porous layer, and the anode being arranged in this order.

5. A nonaqueous electrolyte secondary battery comprising:
   a nonaqueous electrolyte secondary battery insulating porous layer recited in claim 1.

6. A nonaqueous electrolyte secondary battery member comprising:
   a cathode;
   a nonaqueous electrolyte secondary battery laminated separator recited in claim 3; and
   an anode,
   the cathode, the nonaqueous electrolyte secondary battery laminated separator, and the anode being arranged in this order.

7. A nonaqueous electrolyte secondary battery comprising:
   a nonaqueous electrolyte secondary battery laminated separator recited in claim 3.

* * * * *